United States Patent [19]

Wisotzky

[11] 3,894,192

[45] July 8, 1975

[54] DX SIGNALING CIRCUIT

[75] Inventor: Otto G. Wisotzky, San Francisco, Calif.

[73] Assignee: GTE Automatic Electric Laboratories Incorporated, Northlake, Ill.

[22] Filed: July 29, 1974

[21] Appl. No.: 492,666

[52] U.S. Cl. .......... 179/18 AH
[51] Int. Cl. .......... H04m 7/10
[58] Field of Search .......... 179/18 AH

[56] References Cited

UNITED STATES PATENTS 3,763,321 10/1973 Bergquist et al. .......... 179/18 AH
3,849,607 11/1974 Carbrey .......... 179/86

*Primary Examiner*—Thomas W. Brown
*Attorney, Agent, or Firm*—Leonard R. Cool; Douglas M. Gilbert

[57] ABSTRACT

An electronic DX signaling circuit for detection of DC signals on a two-way telephone trunk circuit. A bridge network connects to a cable pair, and a voltage detection circuit connects to four junctions within the bridge circuit. The bridge receives the DC signaling from the cable, and the voltage detection circuit adds and subtracts four voltages within the bridge in such a way so as to recover the desired signaling information from the unwanted received signals.

10 Claims, 4 Drawing Figures

FIG. 2 (PRIOR ART) DX SIGNALING CIRCUIT USING POLAR RELAY

DX SIGNALING CIRCUIT

BACKGROUND OF THE INVENTION

This invention relates to DC line signaling systems for two-way voice-frequency wire-line telephone trunks, and in particular to duplex signaling which permits transmission of supervisory and control signals over a cable pair. Duplex signaling over wire-line trunks is commonly called DX signaling (or E- and M-lead interoffice signaling). Such signaling requires identical, or at least compatible, signaling circuits at each terminating end of a trunk facility.

Communication over a telephone cable pair and between the signaling equipment takes place over two leads: an M-lead and an E-lead. The M-lead transmits the local or near-end signaling condition (on-hook or off-hook) to a distant or far-end office by sending alternately office battery (usually —48 volts) and ground. The E-lead reflects the far-end signaling by providing an open or ground signal. For more detailed information on E- and M-lead signaling, DX signaling, and DX signaling equipment refer to the following references.

1. Newell, N. A., *DX Signaling*, Bell Laboratories Record, June 1960, pp. 216–220.
2. Breen, C. and Dahlbom, C. A., *Signaling Systems for Telephone Switching*, Bell System Technical Journal, Vol. 39, Nov. 1960, pp. 1381–1444.

DX signaling equipment is commonly connected to a cable pair which is a part of a telephone trunk circuit as shown in FIG. 1. The E- and M-signaling leads are connected through the DX signaling equipment to the cable pair via connections A and B as indicated. Since the signaling path and the transmission path of necessity utilize the same cable pair, the voice signals and the DC signaling must be separated from each other at each central office. This is one of the functions of the line transformer (repeat coil) which is functionally considered as part of the trunk circuit. The signaling equipment and the trunk circuit are completely balanced and symmetrical from one office to another, and any differences in ground potential or induced longitudinal voltages are substantially cancelled out. How this is done is explained below.

Early DX signaling equipment used a sensitive polar relay for the detection of supervisory and dial pulsing signals. A simplified drawing of a prior-art circuit, using what is commonly called a DX relay, is shown in FIG. 2. This shows such relays at a near-end office and a far-end office connected by a cable pair.

The four equal relay windings L1–L4 and L1′–L4′ are arranged in a Wheatstone bridge configuration, and a balanced bridge condition is maintained in the idle on-hook circuit condition. Since the cable pair is connected to one leg of the bridge, a resistor-capacitor network is always provided to balance out the impedance offered by the cable circuit. This resistor-capacitor network, shown as $R_L$ and $C_L$, matches the cable pair impedance, which includes the cable loop resistance, the shunt capacity of the cable loop, and the far-end circuit DC input impedance. In all practical situations, the exact value of $R_L$ and $C_L$ neeeded to balance the bridge is determined when the signaling equipment is installed in a particular trunk facility.

The local office battery supply voltage is designated as $V_o$ ($V_o'$ at the far end) in FIG. 2. A simple resistive divider network R31 and R32 (R34 and R35) provide a bias voltage $V_o/2$ ($V_o'/2$). The M-lead is connected through bias resistor R30 (R33) to the bridge circuit. The E-lead is connected to the moving contact of the DX relay and is shown in the idle position. The M-lead is grounded in the idle position, and this causes a bias current to flow to the reference potential, $V_o/2$ ($V_o'/2$), through the bias resistor R30 (R33) and relay windings L2 and L3 (L2′ and L3′). The bias current causes 2 to 3 watts of power to be dissipated in the relay windings and in the resistor bias network.

The DX relay detects the status of the far-end signaling by relying upon the sensitive balance initially established. The state of the relay, and hence the state of the E-lead output, depends entirely upon differences in the bias and operate currents flowing in the windings. When the far-end M-lead (M′) switches to an off-hook condition, office battery ($V_o'$) is applied to the tip side of the cable pair through R33 and relay winding L1′. The difference in potential between the two offices causes a current to flow through the cable pair and through the near-end winding L1 and resistor R30. The product of the L1 winding and the signaling current flowing through L1 is sufficient to overcome the effect of the idle bias current to effect a relay switch. And the E-lead changes from an open condition (idle) to a ground state (busy).

Notice that the far-end DX relay does not operate when the M′-lead switches from ground to battery voltage, $V_o'$. Although the reverse current through windings L2′ and L3′ tends to effect a relay change of state, the current through L1′ neutralizes the current change in L2′ and L3′. This prevents the far-end relay from switching during signaling by the M′-lead. Further notice that any difference in ground potentials between the two offices would produce an equal but opposite current to flow in windings L1 and L4 (L1′ and L4′) which would produce counteracting forces in the relay. Therefore, the effect of such currents or potentials is cancelled.

The DX relay is reliable and performs well if properly adjusted for balance at initial installation and is routinely maintained. However, the DX relay is expensive, and it consumes considerable power even in the idle state. Transistor circuits have been designed to perform the same function as the DX relay, and they are usually much more economical to manufacture. The transistor designs, however, have been at least as wasteful in terms of power consumption as the prior-art DX relay circuit.

An object of the present invention is to provide a DX signaling circuit which consumes less power than other circuits performing the same signaling function.

Another object of the present invention is to provide a DX signaling circuit having improved performance and which is more economical to manufacture than previously designed circuits.

BRIEF DESCRIPTION OF THE DRAWINGS

This invention possesses other objects and features, some of which will be set forth in the description of the preferred embodiment in connection with the accompanying drawings in which.

LESCRIPTION OF THE PREFERRED EMBODIMENT

Figure 1:
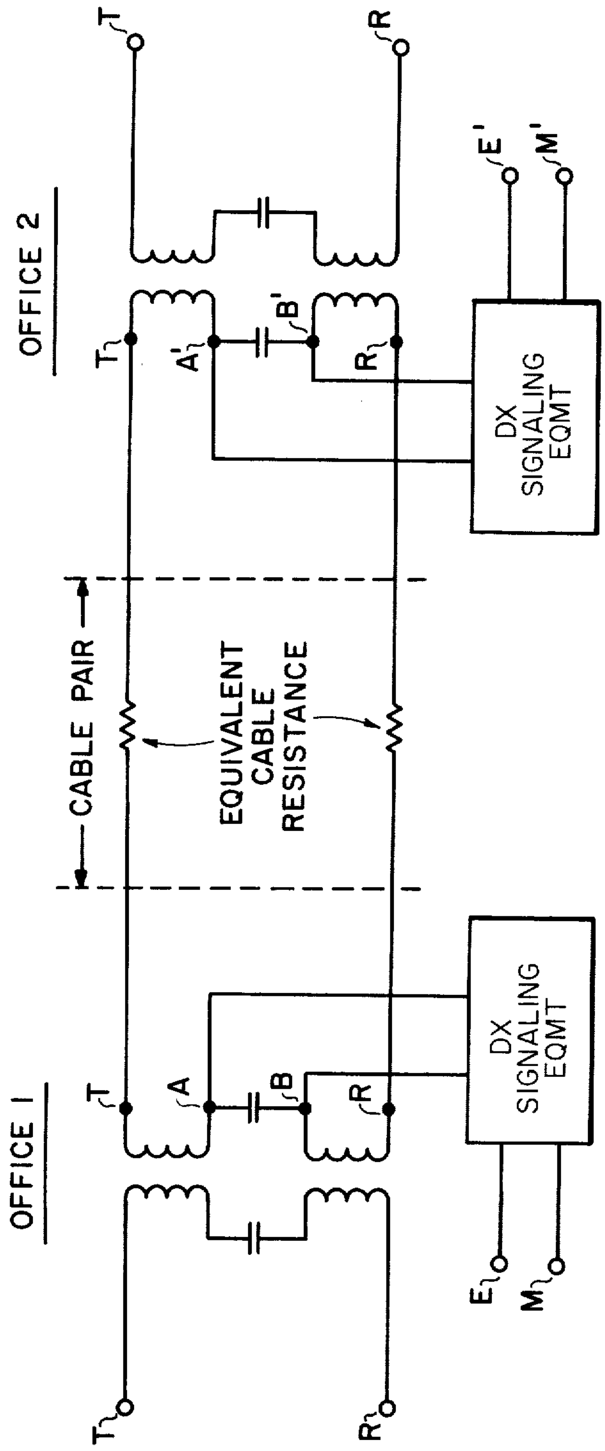
FIG. 1 (PRIOR ART)
FIG. 1 shows a typical prior-art telephone E & M trunk circuit with DX signaling equipment connected. This drawing has been previously discussed in connection with the prior art.
Figure 2:
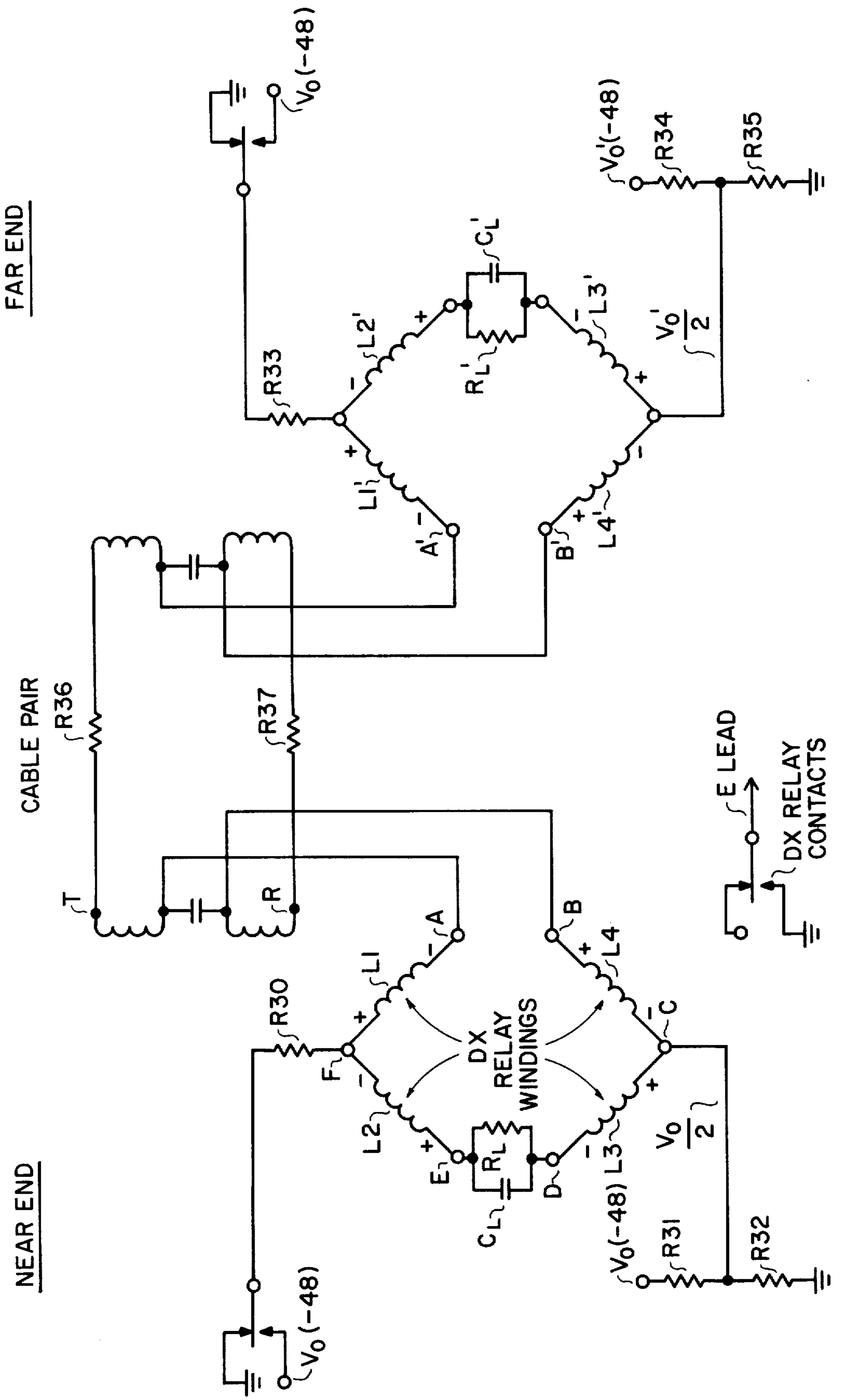
FIG. 2 is a schematic drawing showing a prior-art DX signaling circuit using the polar relay. This drawing also has been previously discussed in connection with the prior art.
Figure 3:
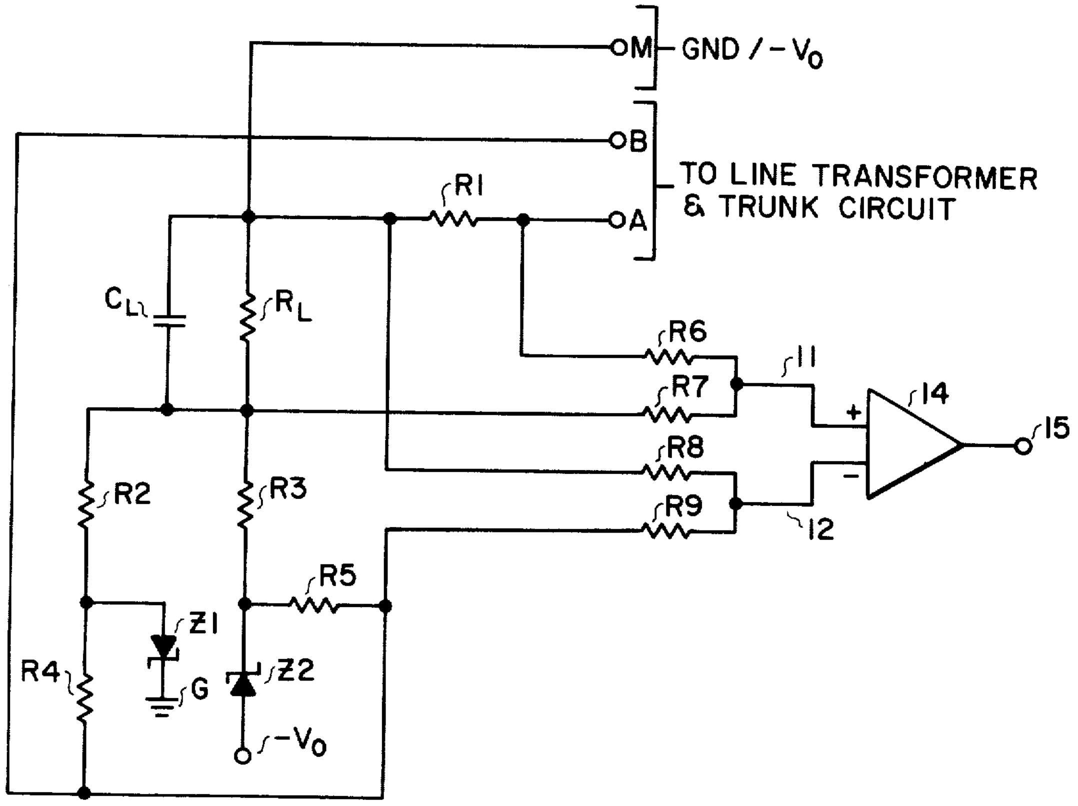
FIG. 3 is a schematic diagram illustrating a preferred embodiment of the improved DX signaling circuit.

Referring to FIG. 3, terminals A and B of the improved DX signaling circuit provide for connection to the tip and ring leads of the cable pair. Resistor R1 is connected in series between terminal A and the local M-lead, terminal M. Terminal B is connected to a biasing network consisting of resistors R4 and R5 and semiconductor Zener diodes Z1 and Z2. To maintain compatibility with signaling circuits presently in operation, the input impedance of the improved circuit at the trunk interface (terminals A and B) must be equivalent to the input impedance of the present signaling circuits. This input impedance is typically 1,220 ohms. Therefore, the resistance of R1 must be equivalent to the DC resistance offered by components L1 and R30 in FIG. 2 (610 ohms). Also, the parallel resistance of biasing resistors, R4 and R5, is the same as the DC resistance of winding L4 in series with the parallel combination of resistors R31 and R32, shown in FIG. 2 (610 ohms).

The parallel combination of capacitor $C_L$ and resistor $R_L$ in FIG. 3 connects the local M-lead to bias resistors R2 and R3. As in the prior art shown in FIG. 2, this resistor-capacitor combination must be equivalent to the line impedance at terminals A and B for a proper bridge balance. Capacitor $C_L$ is equal in value to the shunt capacity of the cable pair at terminals A and B, and resistor $R_L$ is equal in value to the DC resistance offered by the trunk circuit at terminals A and B. Resistor $R_L$ is equivalent to the sum of the cable conductor resistance plus the DC input impedance of the far-end signaling equipment (1,220 ohms total). The cable conductor resistance varies depending upon the length of the cable. The improved signaling circuit will tolerate a resistance up to 5,000 ohms, as is the case with prior-art circuits.

The voltage detection circuit made up of resistors R6 through R9 and amplifier 14 performs an arithmetic addition and subtraction of certain voltages within the bridge circuit. The addition and subtraction of the voltages selected are sufficient to establish the status of the far-end M-lead, M', as shall be shown subsequently. Resistors R6 and R7 sum two voltages: the signaling voltage on the cable, at terminal A, and the voltage at terminal 10 (the junction of $R_L$ and $C_L$ with R2 and R3). The sum of these two voltages appears at line 11. Resistors R9 and R8 also sum two voltages: the voltage on the local M-lead, terminal M, and the voltage on the ring side of the trunk circuit, terminal B. The sum of these two voltages appears at line 12. Amplifier 14 is a differential amplifier which determines the difference between the amplifier inputs at 11 and 12. This amplifier may be replaced by an operational amplifier, or any other similarly designed amplifier which performs the necessary voltage subtraction of the two input signals, 11 and 12. The amplifier output appears at 15 and may be used to drive an inexpensive relay or equivalent switching device to provide the proper E-lead functional output signal.

Typical values for the components shown in FIG. 3 are as follows:

| | |
|---|---|
| R1 = 610 ohms | R6, R7, R8, and R9 = 60 kilohms |
| R2, R3 = 2440 ohms | $R_L$ = 0 to 5 kilohms and |
| R4, R5 = 1220 ohms | $C_L$ = 0 to 5 microfarads |
| Z1 and Z2 have a reverse breakdown voltage of 15 volts. | $V_o$ = −48 volts (office battery potential) |

Figure 4:
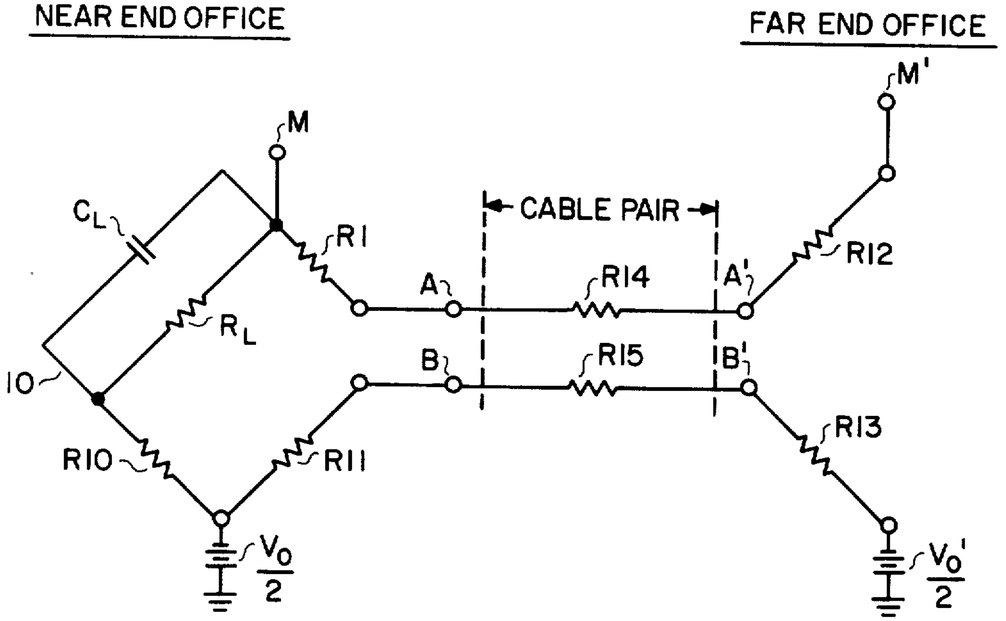
FIG. 4 is an equivalent DC circuit of a portion of the subject invention shown in FIG. 3.

FIG. 4 shows an equivalent DC circuit of a portion of the circuit shown in FIG. 3 and is connected to a cable pair terminated by a second DX switching circuit. Specifically, FIG. 4 excludes the voltage detection and summing networks shown in FIG. 3. Resistor R1 is the same value resistor in FIG. 4 as in FIG. 3, connecting terminal A to terminal M, the local M-lead. The balancing network $C_LR_L$ of FIG. 4 is also the same as in FIG. 3 and is connected between terminal M and terminal 10. Between terminal 10 and ground, the Thevenin equivalent circuit is used in place of the bias network shown in FIG. 3. R10 is the Thevenin equivalent resistance of resistors R2 and R3 and diodes Z1 and Z2. The voltage source, designated as $V_o/2$, is a Thevenin equivalent voltage generator. Similarly, between terminal B and ground, the Thevenin equivalent circuit is used in place of R4, R5, Z1, and Z2.

Resistors R14 and R15, also shown in FIG. 4, represent the line resistance of the cable pair. Resistors R12 and R13 represent the equivalent input impedance of the far-end signaling equipment. From the information given regarding the typical values of the components in FIG. 3, it can easily be shown that R11, R12, and R13 equal 610 ohms, and R10 equals approximately 1,220 ohms.

It can best be illustrated that the invention performs the desired signaling function by referring to FIGS. 3 and 4. The output voltage, at 15, in FIG. 3 may be functionally represented algebraically in terms of the voltage inputs $$V_{out} = V_A + V_{10} - (V_M + V_B) \tag{1}$$

By reference to the equivalent circuit in FIG. 4, equation (1) may be rewritten in terms of the resistive components, the far-end signaling voltage M', and the office supply voltages. Using simple circuit analysis, the following expressions may be obtained.

$$V_A = V_M - \frac{(V_M - V_M \quad)(R1)}{R1 + R12 + R14} \tag{2}$$

$$V_{10} = \frac{V_o}{2} - \frac{(V_o/2 - V_M)(R10)}{R_L + R10} \tag{3}$$

and $$V_B = \frac{V_o}{2} - \frac{(V_o/2 - V_o'/2)(R11)}{R11 + R15 + R13} \tag{4}$$

By substituting the typical resistive values given above into equations 2, 3, and 4 and by substituting the three expressions into equation (1), the following is obtained.

$$V_{out} = (V_M - V_o'/2) \left(\frac{1}{2 + (R_L/1220)}\right) \quad (5)$$

or $$V_{out} = (V_M' - V_o'/2)\,(k) \quad (6)$$

where, $k$ is a constant equal to $1/(2 + (R_L/1220))$.

Expressing this verbally, the output voltage measured at 15 in FIG. 3 is a function of the far-end M-lead, M', and the far-end bias voltage $V_o'/2$, times a fixed constant, $k$. This means that by measurement of near-end voltages, $V_A$, $V_B$, $V_M$, and $V_{10}$, the status of the far-end M-lead, M', can be established.

To demonstrate equation (6), assume that $V_o'/2 = -24$ V. Now if M' is in the idle state, 0 V (ground), from equation (6), $V_{out}$ is equal to $(0 - [-24])\,(k)$, which implies $V_{out}$ is a positive voltage. Therefore, when $V_{out}$ is a positive quantity, M' must be at ground potential (idle state).

If the opposite assumption is made, i.e., M' is in the busy state and if $V_o' \doteq -48$ V, then from equation (6), $V_{out} = (-48 - (-24))\,(k)$. This implies that $V_{out}$ is a negative voltage. Therefore, when $V_{out}$ is a negative quantity, M' must be in the busy state (negative office battery potential).

The improved signaling circuit possesses several features over the prior art. The improved signaling circuit selects the minimum number of signal voltages which are required to determine the status of the far-end M-lead in a working telephone system. A minimum number of components is used in the signaling bridge circuit, which contributes to the low power consumption of the overall circuit. As is evident from FIG. 2, several nonessential components have been eliminated in the preferred embodiment. The use of the biasing network R2, R3, R4, R5, Z1 and Z2 shown in FIG. 3 significantly reduces the idle current drain over the prior art. The power consumption of the prior art is a minimum of approximately 2 to 3 watts, and the power consumption of the improved bridge signaling circuit is less than 1 watt. As the number of trunk circuits at a telephone office increases, the amount of power savings can be significant. The reduction in power consumption reduces the amount of heat dissipation and thus permits a minimization in the size of the physical structure shown in FIG. 3.

Further reduction in the power consumption can be made in the improved signaling circuit without affecting the performance. A requirement of the circuit is that the following ratio be maintained. (Refer to FIG. 4)

$$\frac{R_L}{R10} = \frac{(R14 + R15 + R12 + R13)}{R1 + R11} \quad (7).$$

The resistances R12, R13, R14, and R15 are fixed by the conductor loop and far-end DX circuit. R1 and R11 cannot be changed without affecting the circuit input impedance and thus affecting equipment compatibility. However, if both $R_L$ and R10 are increased by the same ratio, the equality of equation (7) would be unaffected. And, by increasing $R_L$ and R10, the idle current drain can be further reduced since there is a constant bias current in this leg of the bridge circuit.

What is claimed is:

1. In a telephone signaling system, appartus for detecting the polarity of signaling voltages applied over a cable pair, and said apparatus comprising:

an input port having terminals (A and B) for connection to a cable pair;

a first resistor and a capacitor connected in parallel having a terminal (10) at one end, and terminal (M) at the other end, and the parallel combination having an impedance ($Z_{RC}$);

a second resistor of resistance (R1), having one end connected to said terminal (A), and the other end connected to said terminal (M);

first means providing first and second voltage generators, said first voltage generator having a source impedance (R10) and having an output terminal connected to said terminal (10), and said second voltage generator having a source impedance (R11) and having an output terminal connected to said terminal (B);

second means having only two inputs and one output, providing a voltage summation of the voltages appearing on the inputs, one input connected to said terminal (A), and the second input connected to said terminal (10);

third means having only two inputs and one output, providing a voltage summation of the voltages appearing on said inputs, one input connected to said terminal (M), and the second input connected to said terminal (B); and fourth means determining the voltage difference between only two inputs, one input connected to the output of said second means and the other input connected to the outut of said third means.

2. Apparatus as defined in claim 1 and further comprising a near-end signaling voltage generator connected to terminal (M).

3. Apparatus as defined in claim 2 wherein said terminal (A) is connected to the tip lead of said cable pair and said terminal (B) is connected to the ring lead of said cable pair.

4. Apparatus as defined in claim 1 wherein said impedances are related by the expression:

$$\frac{Z_{RC}}{R1} = \frac{Z_L}{R10 + R11}$$

where $Z_L$ is the equivalent impedance offered at the input to said apparatus by said cable pair.

5. Apparatus as defined in claim 3 wherein the impedance ($Z_{RC}$) is equal to the impedance ($Z_L$).

6. Apparatus as defined in claim 1 wherein said first means further comprises:

terminal ($V_o$) connected to a source of office battery voltage;

terminal (G) connected to a source of office ground voltage;

third and fourth resistors connected in series between terminals ($V_o$) and (G), and with the junction of said third and fourth resistors connected to terminal (10);

fifth and sixth resistors connectd in series between terminals ($V_o$) and (G), and with the junction of said fifth and sixth resistors connected to terminal (B).

7. Apparatus as defined in claim 1 wherein said first means further comprises:

terminal ($V_o$) connected to a source of office battery voltage;

terminal (G) connected to a source of office ground voltage;

a first Zener diode operatively connected with its cathode to terminal ($V_o$);

a second Zener diode operatively connected with its anode to terminal (G);

seventh and eighth resistors connected in series, one end connected to the anode of said first Zener diode, the other end connected to the cathode of said second Zener diode, and the junction of said seventh and eighth resistors connected to terminal (C); and ninth and 10th resistors connected in series, one end connected to the anode of said first Zener diode, the other end connected to the cathode of said second Zener diode, and the junction of said ninth and 10th resistors connected to terminal (B).

8. Apparatus as defined in claim 7 wherein said second means further comprises:

11th and 12th resistors connected in series, one end connected to said terminal (A), the other end connected to said terminal (10), and the junction of said 11th and 12th resistors connected to one input to said fourth means.

9. Apparatus as defined in claim 8 wherein said third means further comprises:

13th and 14th resistors connected in series, one end connected to said terminal (M), the other end connected to said terminal (10), and the junction of said 13th and 14th resistors connected to the other input to said fourth means.

10. Apparatus as defined in claim 8 wherein said fourth means further comprises:

a differential amplifier having two inputs and one output.

* * * * *